(12) United States Patent
Buer

(10) Patent No.: US 7,434,672 B2
(45) Date of Patent: Oct. 14, 2008

(54) HUB AND CLUTCH DISK ARRANGEMENT FOR A FRICTION CLUTCH, ESPECIALLY A MULTI-DISK CLUTCH

(75) Inventor: Gerald Buer, Mühlhausen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 326 days.

(21) Appl. No.: 11/446,315

(22) Filed: Jun. 2, 2006

(65) Prior Publication Data
US 2006/0289270 A1 Dec. 28, 2006

(30) Foreign Application Priority Data
Jul. 4, 2005 (DE) .................. 10 2005 025 694
May 6, 2006 (DE) .................. 10 2006 021 146

(51) Int. Cl.
*F16D 13/68* (2006.01)
(52) U.S. Cl. .................. 192/70.17; 192/70.2; 192/212
(58) Field of Classification Search .............. 192/70.17, 192/70.19, 70.21, 212
See application file for complete search history.

(56) References Cited

U.S. PATENT DOCUMENTS

| 1,848,843 | A | * | 3/1932 | Ruesenberg | .............. 192/70.19 |
|---|---|---|---|---|---|
| 6,070,708 | A | * | 6/2000 | Fukuda et al. | ........... 192/70.21 |
| 6,409,002 | B1 | | 6/2002 | Orlamünder et al. | |
| 6,464,058 | B2 | | 10/2002 | Orlamünder | |
| 6,793,058 | B2 | | 9/2004 | Orlamünder | |
| 2006/0006040 | A1 | * | 1/2006 | Orlamunder et al. | ..... 192/70.18 |
| 2006/0249347 | A1 | * | 11/2006 | Buer et al. | ............... 192/70.17 |

FOREIGN PATENT DOCUMENTS

JP 57061828 A * 4/1982

* cited by examiner

*Primary Examiner*—Richard M. Lorence
(74) *Attorney, Agent, or Firm*—Cohen Pontani Lieberman & Pavane LLP

(57) ABSTRACT

A hub for a clutch disk arrangement having a friction lining unit with a radially inner set of teeth, the hub including a hub element which can be connected non-rotatably to a shaft; a torque-transmitting arrangement connected to the hub element and having a radially outer set of teeth; and a ring-shaped connecting element made of sheet metal and having a plurality of axially extending tabs and a plurality of openings between the tabs. The outer teeth of the torque transmitting arrangement and the inner teeth of the friction lining unit engage in the openings so that torque can be transmitted from the friction lining element to the hub. The connecting element is preferably fixed to the torsional vibration damper and the inner teeth are preferably axially moveable in the openings so that the friction lining unit can move axially with respect to other friction lining units in a multi-disk clutch.

15 Claims, 5 Drawing Sheets

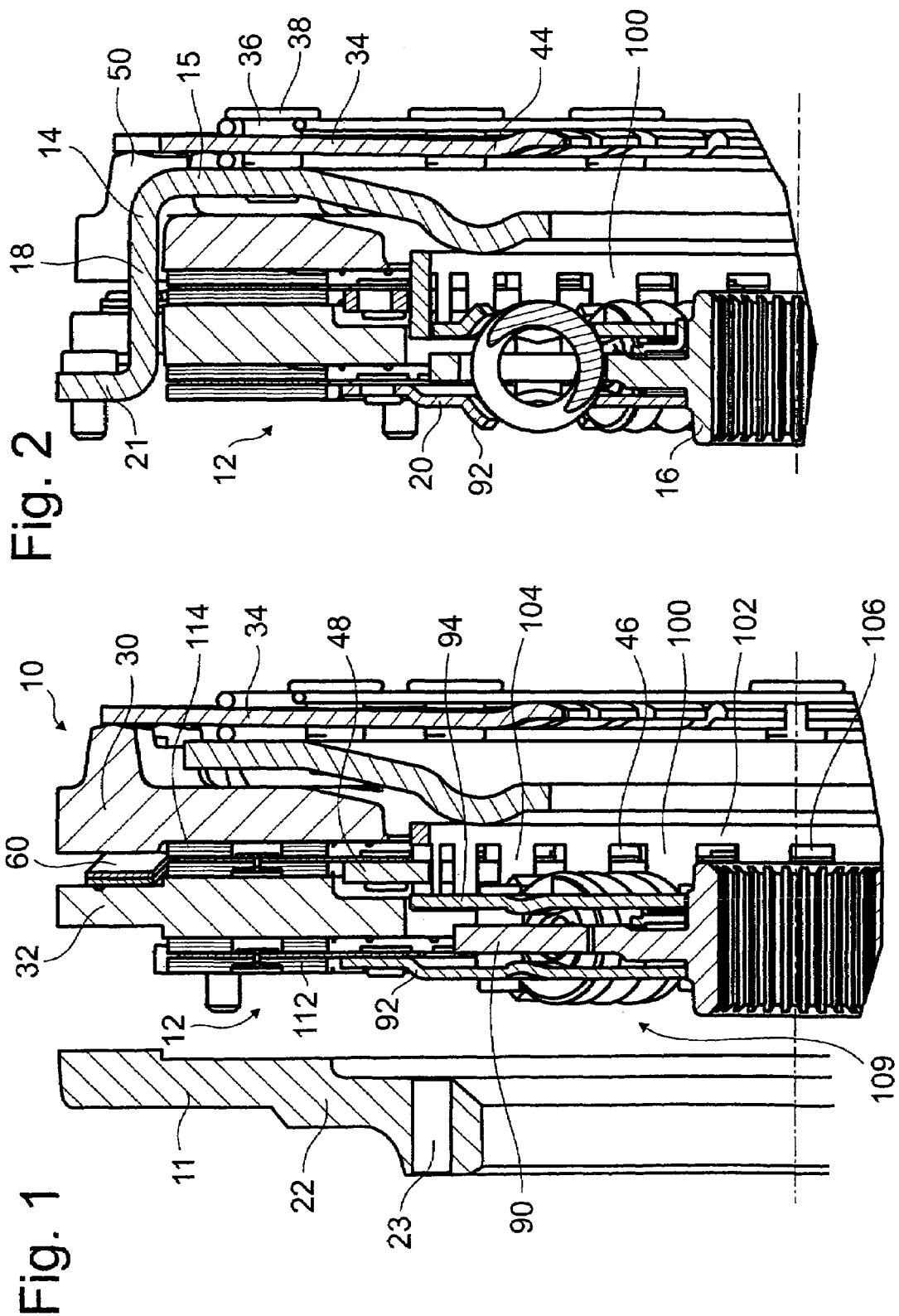

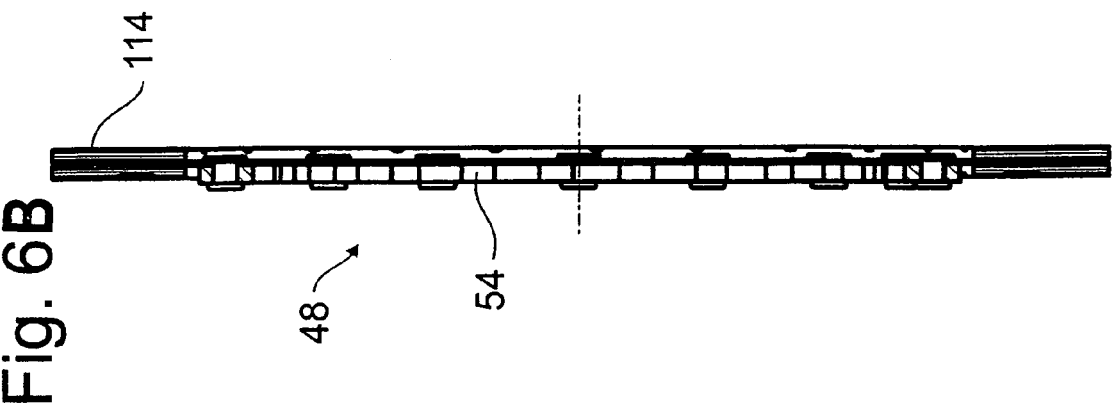
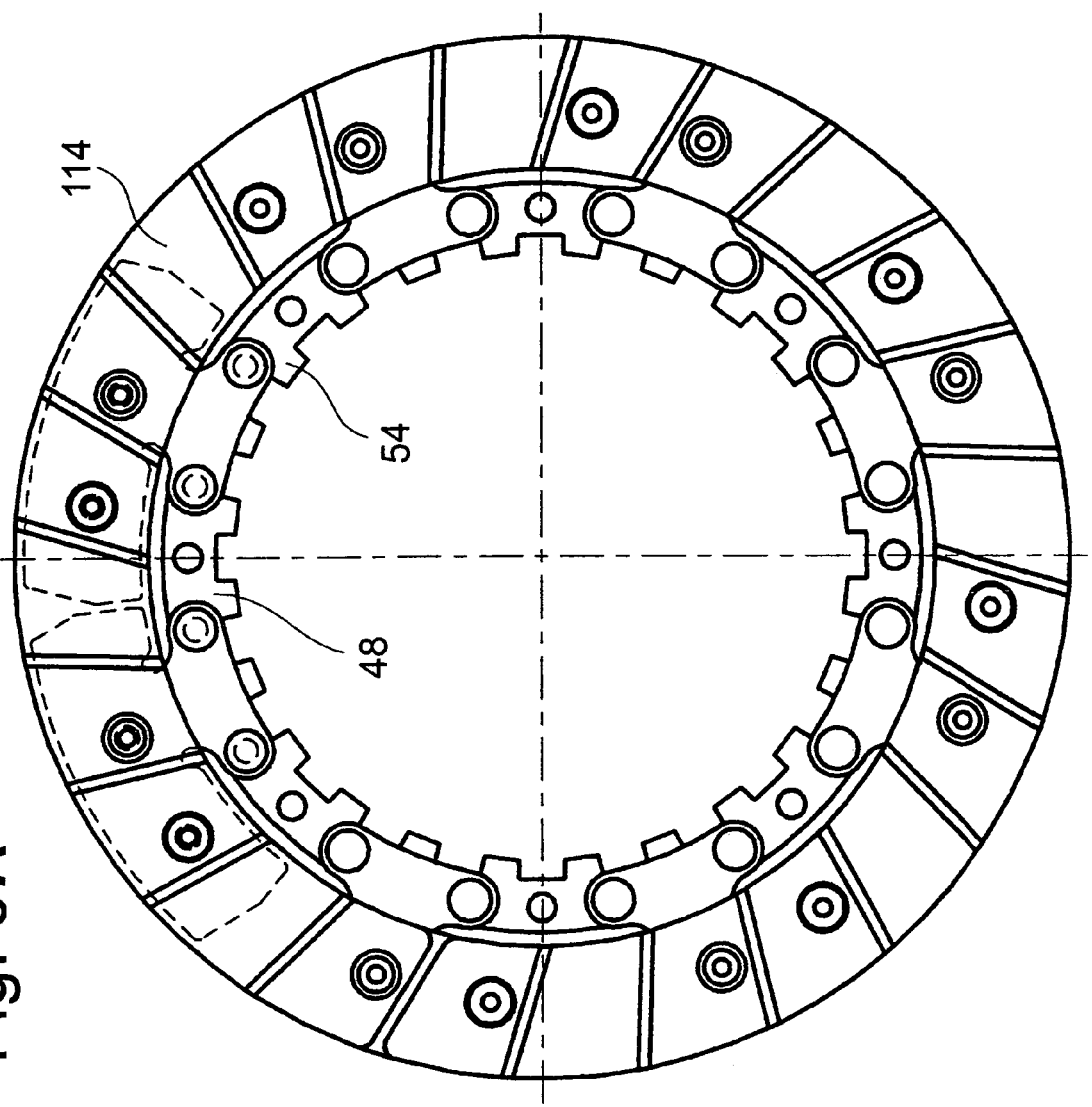

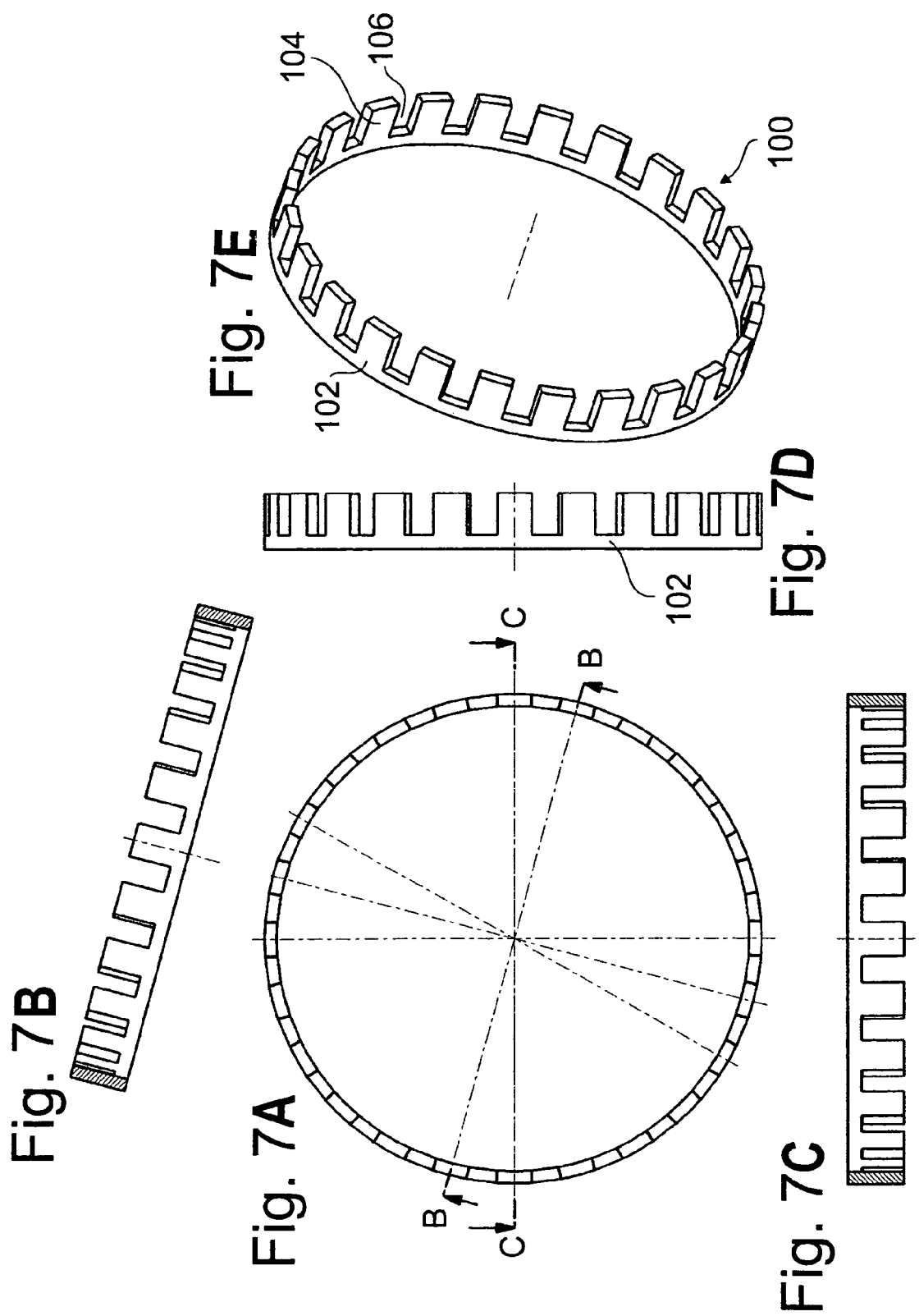

HUB AND CLUTCH DISK ARRANGEMENT FOR A FRICTION CLUTCH, ESPECIALLY A MULTI-DISK CLUTCH

BACKGROUND OF THE INVENTION

1. Field of the Invention

The invention, according to a first aspect, pertains to a hub for a clutch disk arrangement with at least two friction lining units, where at least one of the friction lining units can be shifted relative to one of the other friction lining units in a direction parallel to an axis of rotation, especially for a friction clutch designed as a multi-disk clutch. The invention, according to a second aspect, also pertains to a clutch disk arrangement for a friction clutch designed as a multi-disk clutch.

2. Description of the Related Art

A known hub includes a hub element which can be connected nonrotatably to a shaft, and a circumferential engagement formation serving to drive at least one friction lining unit in rotation, which formation is located on a connecting side of a torque-transmitting arrangement connected to the hub element and can be brought into engagement for rotation in common with an opposing engagement formation of the friction lining unit or of the assigned friction lining unit.

A hub of the type indicated is known, for example, from U.S. Pat. No. 6,464,058. The known hub has a ring element, executed as a sheet-metal part, which has a profile designed to accept the torque to be introduced from friction linings to a shaft. The hub also has a driver with a hub element for transmitting the torque. The driver is also made as a sheet-metal part, and the shape of its radially outer area corresponds to that of the ring element.

A known clutch disk arrangement includes at least two friction lining units; a hub element, which is or can be connected nonrotatably to a shaft; a carrier arrangement, to which the friction lining units are connected at least essentially nonrotatably and by means of which the friction lining units are or can be connected to the hub element; and a torsional vibration damper arrangement, which has a central disk element either permanently connected to the hub element or formed as a one-piece unit with it; two cover disk elements, one on each axial side of the central disk element, which are free to rotate to at least a limited extent relative to the hub element; and a damping and/or spring element arrangement, which acts between the central disk element and the cover disk element. The carrier arrangement includes a first carrier element, which is or can be connected via the torsional vibration damper arrangement to the hub element, and which is either permanently connected to one of the cover disk elements or made as a one-piece unit with it, to which first carrier element one of the friction lining units is permanently connected; and a second carrier element, which is or can be connected via the torsional vibration damper arrangement to the hub element, to which second conductor element another one of the friction lining units is permanently connected and which is or can be connected to the first carrier element for rotation in common while at the same time being free to shift position relative to the first element essentially in the direction parallel to an axis of rotation.

A clutch disk arrangement of the type in question is known, for example, from U.S. Pat. No. 6,793,058; reference is made to FIG. 8 in that document. A clutch disk arrangement of this type is suitable, for example, for use in combination with a pressure plate assembly such as that known from U.S. Pat. No. 6,409,002 to obtain a corresponding multi-disk clutch. In the known clutch disk arrangement, the second carrier element is arranged on the first carrier element so that it can shift position in a direction parallel to the axis of rotation, where an outer set of teeth on the first carrier element engages for rotation in common with an inner set of teeth on the second carrier element. The two carrier elements are each designed in the form of cups, where the outer teeth of the first and the inner teeth of the second carrier element are formed on sections of the circumferential walls of the two elements. These circumferential wall areas, which extend in the axial direction, bridge an axial gap, the size of which depends on the minimum axial distance between the friction lining units. The known dual clutch disk therefore takes up a comparatively large amount of radial and axial space radially inside the friction lining units; allowances for this space requirement must be made either on the engine side or on the transmission side, and it is also necessary on the gearbox side to allow room for the actuation of the clutch during the clutch-releasing-and-engaging process and possibly for the inward travel of the spring tongues of a diaphragm spring, which serves as a force storage device.

With respect to the coupling of the two carrier elements by means of their teeth, it is observed that the production of these types of toothed rims is comparatively complicated technically and is therefore also comparatively expensive.

SUMMARY OF THE INVENTION

Against this background, a first task of the present invention is to provide a hub of the type indicated above which can be produced at especially low cost.

A second task of the invention to provide a clutch disk arrangement of the type indicated above which, as a result of its design, is favorable for optimal utilization of the available space.

A third task of the invention to provide a clutch disk arrangement of the type indicated above which can be produced at comparatively low cost.

According to a first aspect of the invention, referring to the known hub, the connecting side is formed by at least one connecting element of the torque-transmitting arrangement, at least certain areas of this element being made of flat metal material, especially sheet metal, where the connecting element has webs or tabs, which extend essentially in the axial direction and are made of flat metal material, and radially continuous openings between these webs or tabs, the combination of the webs or tabs and the openings between them thus forming the engagement formation preferably serving as the outer set of teeth.

According to a second aspect of the invention, referring to the known clutch disk arrangement, the second carrier element is or can be connected to the first carrier element via the torsional vibration damper arrangement, where the other cover disk element or an intermediate carrier element permanently connected to it serves as a connecting element for supporting the second carrier element and for establishing a connection for rotation in common with it. At least certain areas of this connecting element are made of flat metal material, especially sheet metal, in which webs or tabs extending essentially in the axial direction with radially continuous openings between them are made, the combination of the webs or tabs and the openings thus form the first engagement formation serving preferably as the outer set of teeth.

The inventive execution of the engagement formation or of the first engagement formation in flat metal material, especially sheet metal, specifically the execution of the engagement formation or of the first engagement formation as a set of essentially axially-oriented webs or tabs with radially continuous openings between them in the flat metal material, means that only simple production technology is required, which leads to corresponding cost advantages. In particular, there is no need according to the invention to machine a toothed ring out of solid material, and this is obviously advantageous in terms of industrial production.

Additional advantages are also obtained according to the invention with respect to the inventive clutch disk arrangement. Because the second carrier element is or can be connected via the torsional vibration damper arrangement to the first carrier element, the torsional vibration damper arrangement can at least help to bridge the axial gap between the two carrier elements, which means that the axial dimension of one or both of the carrier elements can be reduced to a corresponding extent. The only point which remains to be considered is that at least one of the elements connecting the second carrier element to the first carrier element or the first and/or the second carrier element itself must be designed in such a way that the two carrier elements are able to shift position relative to each other in the direction parallel to the axis of rotation while still maintaining their connection for rotation in common.

The inventive hub can be part of an inventive clutch disk arrangement. In this respect but also independently of it, it is proposed that the hub be executed with a torsional vibration damper arrangement integrated into it, preferably having a central disk element, which is connected to the hub element or which forms a one-piece unit with it; two cover disk elements, one on each side of the central disk element, these cover disk elements being free to rotate at least to a limited extent relative to the central disk element; and a damping and/or spring element arrangement acting between the central disk element and the cover disk elements.

The torque-transmitting arrangement can be formed by the torsional vibration damper arrangement or carry it. In this context the basic idea is that a first cover disk element should form or carry the connecting element or that the connecting element be connected nonrotatably to the first cover disk element.

With respect to the inventive clutch disk arrangement, it is proposed by way of elaboration that the second carrier element be connected or that it be possible to connect it nonrotatably to the other cover disk element by means of the first engagement formation and that it be able to shift position with respect to that other element in a direction essentially parallel to the axis of rotation. With respect to the first carrier element, it is preferable that it be formed by a cover disk element itself and that this cover disk element be nearly flat or cranked only slightly and be made of comparatively thin material.

With respect to the second carrier element, it is proposed as being especially advantageous that it have an essentially radially inward-oriented second engagement formation, preferably forming an inner set of teeth, which is or can be brought into engagement with the first engagement formation for rotation in common. The basic idea here is that the second carrier element should be formed by an essentially flat (or nearly flat) ring-shaped disk part, which carries the second engagement formation such as an easy-to-fabricate inner set of teeth on its inside circumference.

The following proposals for elaborations pertain both to the inventive hub and also to the inventive clutch disk arrangement.

The engagement formation of the hub, i.e., the first engagement formation of the clutch disk arrangement, is preferably elongated in the direction parallel to the axis of rotation to give the friction lining units a certain freedom of axial movement relative to each other. The distance over which the engagement formation in question extends in the direction parallel to the axis of rotation, however, has to be only large enough to allow the relative axial displacement which occurs between the friction lining units in question or between the two carrier elements during operation while reliably preserving the connection for rotation in common between them.

It is advantageous for at least certain areas of the connecting element or of a combination element including the connecting element, the combination element being formed on one side especially by the other cover disk element or an additional element, preferably a disk element, of the torque-transmitting arrangement and, on the other side, by the connecting element mounted on the cover disk element or additional element, to have a cup-like shape at least with respect to radial cross-sectional lines passing through at least one web or at least one tab, where a circumferential wall area of this element, made with interruptions, carries the engagement formation or the first engagement formation. In this context the basic idea is that the circumferential wall area is formed by the webs or tabs and is interrupted by the openings.

It is especially advantageous if the connecting element or intermediate carrier element is designed as a ring-shaped part, especially a ring-shaped part of sheet metal, which carries the webs or tabs. It is advantageous for the ring-shaped part to have at least one ring-shaped section which extends continuously around the entire circumference, from which the webs or tabs, which are integrally connected to the ring-shaped section, project in the axial direction. It is proposed as being especially effective that precisely one ring-shaped section passing continuously around the circumference be provided, and that each of the webs and tabs have a free terminal section a certain distance away from the ring-shaped section.

The ring-shaped part can have a simple shape. The main idea here is that at least the webs or tabs of the ring-shaped part, preferably at least the ring-shaped section and the webs or tabs, and most preferably the entire ring-shaped part should lie in a circular-cylindrical hyperplane. The ring-shaped part is therefore very easy to manufacture. For example, the webs or tabs and the openings between them can be stamped out of a sheet metal strip, and the sheet-metal strip can then be shaped into a ring. The ends of the sheet-metal strip can be welded together so that the ring-shaped part forms a continuous piece of the same material. This is not mandatory, however.

The ring-shaped part may be permanently connected, especially connected in substance and/or positively, to the additional element or to one of the additional elements of the torque-transmitting arrangement or to the other cover disk element, preferably to a radially outer circumferential area of that element, at least with respect to forces acting in the circumferential direction and preferably with respect to forces acting in the axial and/or radial direction. It can be advantageous for the ring-shaped part to be welded to the additional element or to the other cover disk element, preferably to one of two ring-shaped sections of the ring-shaped part or, preferably, to the tabs or webs of the ring-shaped part, especially to the free terminal sections of the tabs or webs.

It is especially easy to attach the ring-shaped part to the additional element of the torque-transmitting arrangement or to the other cover disk element if the additional element or the other cover disk element has a circle of openings extending around the circumference, into which the tabs or webs of the ring-shaped part, especially the free terminal sections of the tabs or webs, can positively engage. In this way, an especially reliable connection for rotation in common is established between the additional element or cover disk element and the ring-shaped part. An effective design is characterized in that the radially outer circumferential area of the additional element or of the other cover disk element is provided with a set of teeth, the teeth being separated by openings. It is advantageous for the width of the tooth sections in the circumferential direction to increase as the tooth proceeds radially outward, so that a clamping type of engagement is created between the tabs or webs and the adjacent tooth sections.

With respect to the inventive hub in its various elaborations as discussed above, the basic idea is that the additional element of the torque-transmitting arrangement will be formed by the first of the cover disk elements.

The invention also provides in particular a clutch disk arrangement for a friction clutch designed as a multi-disk clutch, which comprises an inventive hub.

The invention also provides a friction clutch, comprising a pressure plate assembly and an inventive clutch disk arrangement. The pressure plate assembly may include a housing, which is made with an abutment arrangement or is or can be connected to such an abutment arrangement for rotation in common; a plate arrangement with at least one plate, which is installed in the housing with the ability to rotate along with the housing around the axis of rotation and which can shift position relative to the housing in the direction parallel to the axis of rotation; a force storage device to generate a pressing force acting on or by way of a pressure plate of the plate arrangement, where the force storage device is or can be supported directly or indirectly against the housing and against the pressure plate; and a releasing spring arrangement, which is assigned to the plate arrangement, and which can be put under tension by the action of the pressing force exerted on the pressure plate to generate an elastic restoring force acting at least on the pressure plate in the direction opposite the pressing force.

The plate arrangement can have at least one intermediate plate, which can rotate with the housing around the axis of rotation and which is located between the abutment arrangement and the pressure plate with freedom to shift position axially with respect to the housing in the direction parallel to the axis of rotation. The idea here in particular is that the clutch disk arrangement can be clamped between the abutment arrangement and the plate arrangement, especially between the abutment arrangement and an intermediate plate or between two intermediate plates or between an intermediate plate or the intermediate plate and the pressure plate. It is advantageous for at least one plate of the plate arrangement to be held in the housing or at least supported radially and/or prevented from making relative rotation by a releasing spring arrangement, which acts between this plate and the housing or between this plate and at least an intermediate part which is assigned to the housing and which is or can be rigidly connected to it.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

FIG. 1 is a longitudinal cross section through an inventive clutch disk arrangement together with an associated pressure plate assembly and thus shows an inventive friction clutch, present here in the form of a multi-disk clutch;

FIG. 2 is another longitudinal cross section through the clutch disk arrangement together with a pressure plate and an intermediate plate of a plate arrangement of the pressure plate assembly but without the flywheel serving as the abutment;

FIG. 6A is an axial view of a driver disk together with the friction lining disk of the friction lining unit mounted on it;

FIG. 6B is a longitudinal cross section through these components;

FIG. 7A is an axial view of a ring-shaped sheet-metal part which serves to hold the driver disk according to FIG. 6 on the cover plate according to FIG. 5;

FIG. 7B is a cross section through the ring-shaped part along line B-B of FIG. 7A;

FIG. 7C is a cross section through the ring-shaped part along line C-C of FIG. 7A;

FIG. 7D is a side view of the ring-shaped part; and

FIG. 7E is a perspective view of the ring-shaped part.

DETAILED DESCRIPTION OF THE PRESENTLY PREFERRED EMBODIMENTS

Figure 3C:
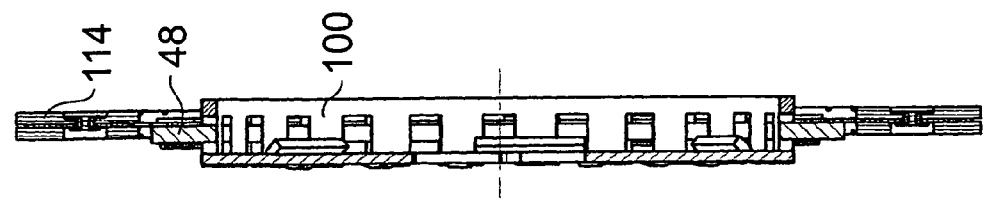
FIG. 3C is a longitudinal cross section through the cover plate and the friction lining unit along line C-C of FIG. 3A.
Figure 3B:
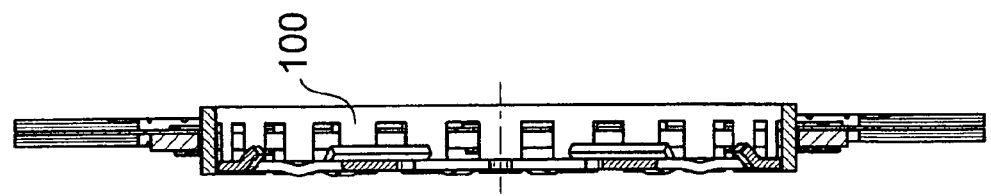
FIG. 3B is a longitudinal cross section through the cover plate and the friction lining unit along line B-B of FIG. 3A.
Figure 3A:
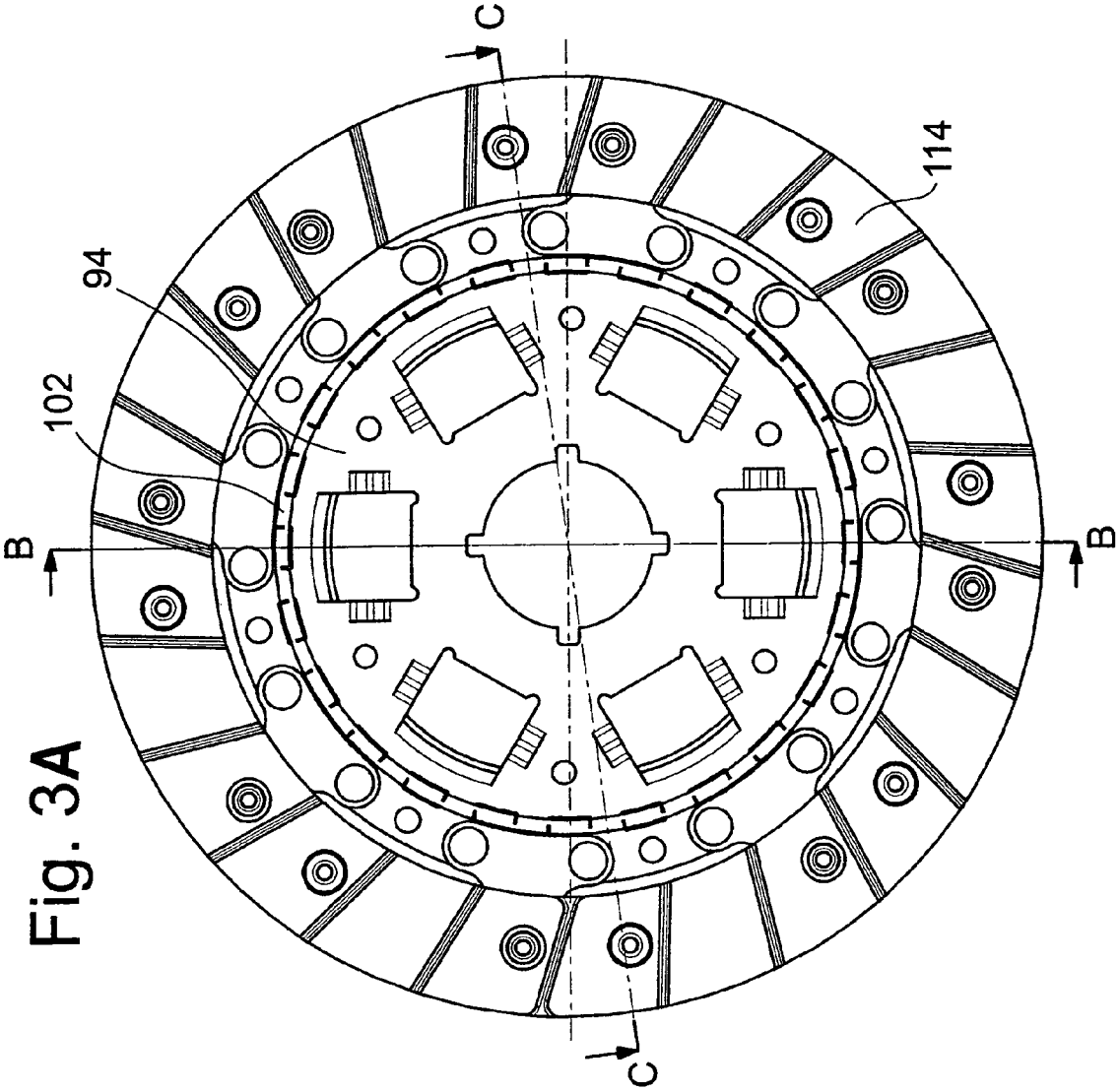
FIG. 3A is an axial view of a cover plate of a torsional vibration damper arrangement of the multi-disk clutch together with a friction lining unit mounted on it.

FIGS. 1 and 2 show an exemplary embodiment of a multi-disk clutch in its entirety with its plate arrangement, comprising an intermediate plate and a pressure plate; with the entire pressure plate assembly, which comprises the plate arrangement and a flywheel serving as an abutment, which is part of a clutch housing; and with a dual-disk clutch disk arrangement. The parts of the clutch disk arrangement itself are shown in FIGS. 3-7.

The design and function of the friction clutch, especially of its pressure plate assembly, can be easily understood on the basis of the disclosure of U.S. Pat. No. 6,409,002, which is incorporated by reference in the disclosure of the present application.

The design and function of the clutch disk arrangement can be easily understood on the basis of the disclosure of U.S. Pat. No. 6,793,058, which is incorporated by reference in the disclosure of the present application.

The friction clutch 10 shown in FIGS. 1 and 2 comprises a clutch housing 11. An essential component of the clutch housing is a flywheel 22, which is designed to be screwed to an engine takeoff shaft, i.e., either directly to the engine takeoff shaft or indirectly by means of a torque-transmitting arrangement provided between the engine takeoff shaft and the clutch, comprising, for example, a flexplate and/or a torsional vibration damper or a dual-mass flywheel. Appropriate screw holes are designated by the number 23.

The clutch housing also has a wall part 14, which has a section 15, which can be called a "housing cover" or a "housing base", and which carries a diaphragm spring 34. The wall part has several axially-oriented support or bracing sections 18, which are distributed around the circumference and are integral parts of the section 15. These support sections are designed with integral flange-like housing feet 21, by means of which the housing wall part 21 can be connected to the flywheel 22. For this purpose, the housing feet 21 are provided with screw holes.

The diaphragm spring 34 is permanently attached by rivets 36 to the cover section or base 15. Two support rings, just radially outside the rivets, are provided, one between the section 15 and the diaphragm spring 34 and the second between the diaphragm spring 34 and the retaining head 38 of the rivet. One of these rings provides linear support for the diaphragm spring 34 against the section 15, whereas the other ring provides linear support against the heads of the rivets, and to this extent the rings make it possible for the spring tongues 44 of the diaphragm spring serving as a force storage device to pivot, which leads to the release of the friction clutch. The diaphragm springs project radially inward, where they can be actuated by the release ring (not shown) of a clutch-release mechanism.

In the housing, a plate arrangement, formed by a pressure plate 30 and an intermediate plate 32, is located in a volume area formed between the flywheel 22 and the cover or base section 15. A friction lining unit 114 is located between the pressure plate 30 and the intermediate plate 32, and a friction lining unit 112 is located between the intermediate plate 32 and the flywheel 22, which serves as an abutment plate. The friction lining units belong to a clutch disk arrangement 12, which is designed with a torsional vibration damper 109, which acts between the friction lining units and a clutch hub element 16. The friction lining unit 112 located between the flywheel 22 and the intermediate plate 32 is attached to one of the cover plates, namely, to the cover plate 92 on the left in FIGS. 1 and 2, whereas the other friction lining unit 114 is guided by means of a driver ring 48 so that it can shift position axially on an outer set of teeth, formed in a special way, on the other cover plate 94 of the torsional vibration damper, and thus transmit torque. The cover plates and the driver ring 48 serve as a carrier arrangement for the friction lining units. In FIG. 2, a section 20 of the cover plate 92 serves as a carrier element for the friction lining unit 112.

The diaphragm spring 34 exerts force on the pressure plate 30 in such a way as to push it toward the flywheel 22. The friction lining units are then clamped between the pressure plate 30 and the intermediate plate 32 and between the intermediate plate 32 and the flywheel 22. The clutch is thus now engaged. By actuation of the spring tongues 44 by means of the previously mentioned release ring in the manner of a displacement in the direction toward the flywheel, the exertion of force on the pressure plate 30 can be at least partially suspended to bring about the partial or complete release of the clutch. The pressure plate 30 and the intermediate plate 32 are pressed apart by a releasing spring arrangement acting between these components, and a similar arrangement presses the intermediate plate 32 and the flywheel 22 apart, so that the frictional engagement of the plate arrangement and of the flywheel with the friction lining units is then suspended, and the friction clutch is correspondingly released. This release is associated with a corresponding axial displacement of the friction lining unit 114, which is pushed away by the intermediate plate 32, which moves toward the diaphragm spring 34 under the restoring force of the spring arrangement. The diaphragm spring 34 is in direct contact with the support ribs 50 of the pressure plate 30, this contact being established by tabs, which project radially from a ring-shaped section of the diaphragm spring 34.

The releasing spring arrangement is formed by first tangential leaf springs acting between the clutch housing 12 and the intermediate plate 32 and by second tangential leaf springs acting between the intermediate plate 32 and the pressure plate 30. Of these springs, only one tangential leaf spring pair 60 can be seen in FIG. 1, acting between the intermediate plate 32 and the pressure plate 30. One set of tangential leaf springs can be riveted at one end to the pressure plate 30 and at the other end to the intermediate plate 32, while the other set can be riveted at one end to the intermediate plate 32 and at the other end to the flywheel 22. With respect to the first tangential leaf springs acting between the clutch housing 12 and the intermediate plate 32, furthermore, it is also possible for the tangential leaf springs in question to be attached on the housing side to fastening sections proceeding from the housing feet 21. Several first and several second tangential leaf springs are provided, which are distributed around the circumference and which ensure that the intermediate plate 32 and the pressure plate 30 are held in the housing and supported radially in a defined manner and prevented from rotating relative to the housing. The tangential leaf springs have the function of transmitting torque between the clutch housing on the one side and the intermediate plate 32 and the pressure plate 30 on the other side.

The torsional vibration damper 109 is designed in the conventional manner. The hub element 16 is designed with a central disk element 90, which is permanently connected to the hub element. In the present case, the central disk element is an integral part of the hub element. On each axial side of the central disk element is a cover disk element, i.e., the cover disk element 92 on one side and the cover disk element 94 on the other, which are able to rotate relative to the hub element 16. Between the central disk element 90 and the cover disk element 92 and between the central disk element 90 and the cover disk element 94 are friction and support rings and a thrust spring, which produces the desired frictional engagement. The two cover disk elements are connected to each other for rotation in common relative to the hub element in the conventional manner, e.g., by means of axially oriented connecting pins, which also hold them the desired axial distance apart. The cover plate elements and the central disk element each have spring windows, against the circumferential ends of which damping springs are supported, which allow rotational movement of the cover disk elements relative to the hub element and its central disk element. The damping springs, as can be seen in FIGS. 1 and 2, can be formed by helical compression springs, possibly also by two helical compression springs with turns of different diameters, telescoped into each other.

Each of the friction lining units 112 and 114 is formed by a lining carrier disk and the friction linings, which are attached to the two axial sides of the lining carrier disk. The friction lining unit 112 located between the flywheel 22 and the intermediate plate 32 is permanently attached by its friction lining carrier disk to the cover disk element 92 by means of rivets, for example. The other friction lining unit 114 is permanently attached by its lining carrier disk to a carrier element 48, which can also be called a driver disk or driver ring, possibly also by means of rivets. The driver ring 48 has an inner set of teeth 54, by which it is seated on an axially elongated, specially formed outer set of teeth 46 on the cover disk element 94 facing away from the flywheel.

To form this outer set of teeth 46, a sheet-metal ring 100 (FIG. 7E) is attached to a radially outer circumferential area of the cover disk element 94. This sheet-metal ring has webs 104, projecting from a ring-shaped section 102; between these webs, the sheet-metal ring is interrupted by openings 106. In the circumferential direction, webs 104 and openings 106 alternate in a uniform manner. Into each opening 106, one of the teeth of the inner set of the teeth 54 of the driver ring 48 engages, as can be seen in FIGS. 1, 2, 3B and 3C.

The webs 104 are inserted into openings 108 between the teeth 110 on the outside circumference of the cover disk element 94. The width of the teeth 110 in the circumferential direction increases slightly as the teeth proceed radially outward, which provides a certain clamping action on the webs 104. The free ends of the webs 104 are pushed between the teeth 110, so that the ring-shaped section 102 of the sheet-metal ring forms an axial stop for the inner teeth 54 of the driver ring 48. The cover disk element 94 itself forms an axial stop in the opposite direction.

Figure 4:
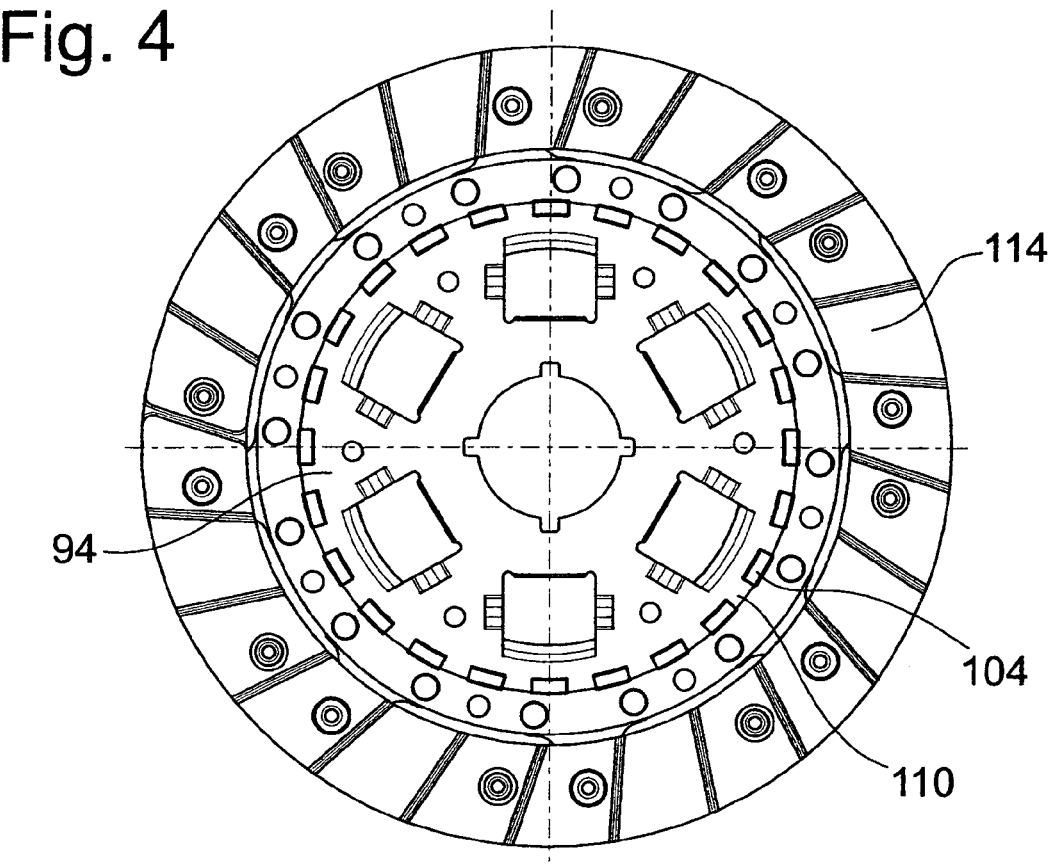
FIG. 4 is an axial view of the cover plate and of the friction lining unit according to FIG. 3 from the other axial side.
Figure 5:
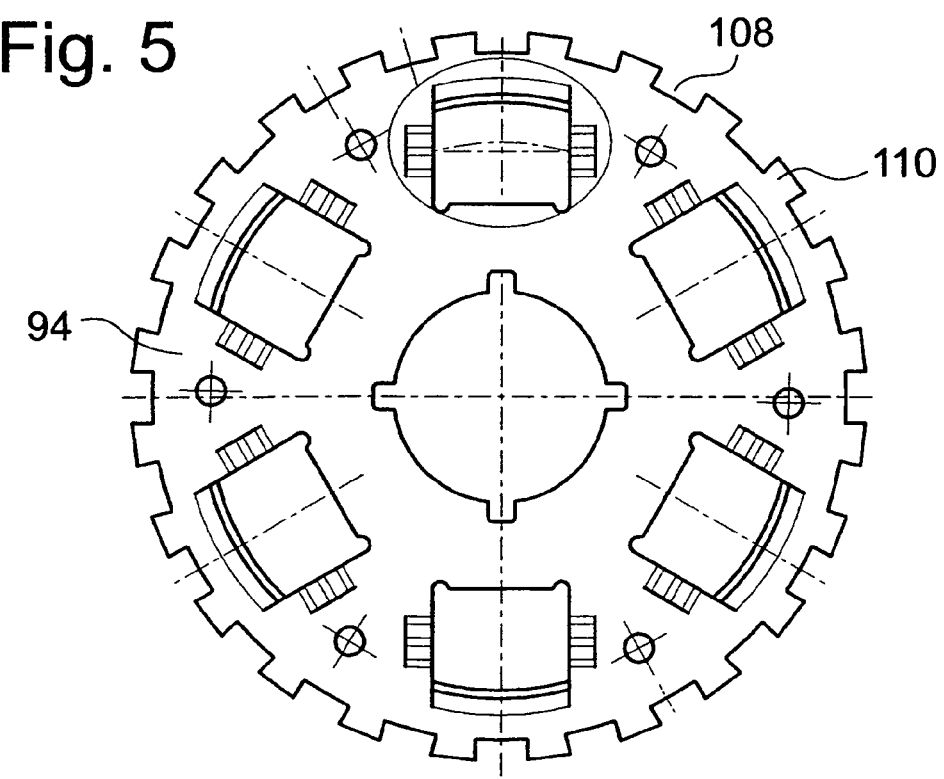
FIG. 5 is an axial view of the cover plate alone.

The connection established between the driver ring 48 and the cover disk element 94 by the sheet-metal ring 100 makes it possible for the inner set of teeth 54 to be guided with comparatively little friction and with a certain freedom of axial displacement on the special outer set of teeth 46 of the cover disk element 94, formed by the webs 104 and the radially continuous openings 106 between them. The sheet-metal ring 100 is preferably welded to the cover disk element 94. That is, as shown in FIG. 4, the free ends of the webs 104 are welded to the outside circumference of the cover disk element 94, which gives the cover disk element 94 additional resistance to tilting or bending, and this in turn reliably prevents the outer teeth formed by the webs 104 and the intermediate spaces 106 from becoming jammed in the inner teeth of the driver ring 48.

Thanks to the previously described functions of retention, connection for rotation in common, and axial guidance of the driver ring 48 on the cover disk element 94 performed by the sheet-metal ring 100, the friction lining unit 114 can move freely within the axial range defined by the stops, while the necessary torque-transmitting connection in the circumferential direction is also achieved, and in addition the driver ring 48 is held in a defined radial position along with the friction lining unit 114. The parts are very easy to assemble, because the driver ring 48 with the friction lining unit 114 is held unlosably on the cover disk element 94. The inner set of teeth 54 of the driver ring 48 is first inserted into the openings 106 between the sheet-metal webs 104, and then the webs 104 of the sheet-metal ring are welded to the cover disk element 94.

In comparison with conventional solutions with teeth formed in solid material, the solution described here offers the considerable advantage that the sheet-metal ring with its webs and the openings between them can be produced at very low cost by stamping and forming. The driver ring 48 with its inner set of teeth can also be produced very easily and cheaply. In comparison with conventional toothed rings, the special outer teeth of the cover disk element 94 and the inner teeth of the driver ring 48 can be produced much more simply and thus also at much lower cost.

As can be seen especially clearly in FIGS. 1 and 2, the cover disk elements 92, 94 are essentially flat or only slightly cranked and to this extent are especially easy to manufacture. The cover disk elements are preferably designed as cover plates of sheet metal.

The hub element 16 together with the torsional vibration damper 106 and the ring-shaped part 100 attached to the cover disk element 94 can be interpreted as the hub of the clutch disk arrangement 12. It is conceivable that the sheet-metal ring 100 could be designed with webs 104 which extend even farther in the axial direction, so that several driver rings similar to the driver ring 48, each of which carries a friction lining unit, could be guided axially on these webs. As a result, a clutch disk arrangement with several friction lining units, for example, could be connected via the one ring-shaped part 100 to the hub element 16.

The invention also pertains to a hub for a clutch disk arrangement with at least two friction lining units, in which arrangement at least one of the friction lining units can shift position relative to at least one other friction lining unit in the direction parallel to an axis of rotation, especially for a friction clutch designed as a multi-disk clutch. The hub includes a hub element 16, which is or can be connected nonrotatably to a shaft; and a circumferential engagement formation 46 serving to drive at least one friction lining unit 114 in rotation. This formation is located on a connecting side of a torque-transmitting arrangement 109 connected to the hub element, and can be brought into engagement for rotation in common with an opposing engagement formation of the friction lining unit or of the assigned friction lining unit. It is proposed that the connecting side is formed by at least one connecting element 100 of the torque-transmitting arrangement, at least certain areas of this element being made of flat metal material, especially sheet metal, where the connecting element has webs 104 or tabs, which extend essentially in the axial direction and are made of flat metal material, and radially continuous openings 106 between these webs or tabs, the combination of the webs or tabs and the openings between them thus forming the engagement formation 46 preferably serving as the outer set of teeth. What is provided in particular is a clutch disk arrangement 12 equipped with a hub of this type for a friction clutch 10 designed as a multi-disk clutch.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A hub for a clutch disk arrangement having a friction lining unit with a radially inner set of teeth, said hub comprising:
    a hub element which can be connected non-rotatably to a shaft;
    a torque-transmitting arrangement connected to the hub element and having a radially outer set of teeth; and
    a connecting element made of sheet metal and having a plurality of axially extending tabs and a plurality of openings between said tabs, said outer teeth of said torque transmitting arrangement and said inner teeth of said friction lining unit engaging in said openings.

2. The hub of claim 1 wherein said torque transmitting arrangement comprises a torsional vibration damper, said torsional vibration damper comprising a central disk element connected to the hub element, a pair of cover disk elements located on opposite axial sides of the central disk element, and at least one damping spring effective to damp rotation of said cover disk elements relative to said central disk element.

3. The hub of claim 2 wherein said radially outer teeth are formed on one of said cover disk elements.

4. The hub of claim 2 wherein the connecting element is fixed to one of said cover disk elements, said inner teeth of said friction lining element being moveable axially in said openings.

5. A clutch disk arrangement for a multi-disk clutch, said arrangement comprising:
- a hub element which can be connected non-rotatably to a shaft;
- a first friction lining unit and a second friction lining unit;
- a torsional vibration damper comprising a central disk element connected to the hub element, first and second cover disk elements located on opposite axial sides of the central disk element, said second cover disk unit having a radially outer set of teeth, and at least one damping spring effective to damp rotation of said cover disk elements relative to said central disk element;
- a first carrier element connecting said first friction lining unit to said first cover disk element;
- a second carrier element connecting said second friction lining unit to said second cover disk element, said second carrier element having a radially inner set of teeth; and
- a connecting element made of sheet metal and having a plurality of axially extending tabs and a plurality of openings between said tabs, said outer teeth of said second cover disk and said inner teeth of said friction lining unit engaging in said openings.

6. The clutch disk arrangement of claim 5 wherein said second friction lining unit can move axially with respect to said torsional vibration damper.

7. The clutch disk arrangement of claim 5 wherein the connecting element is fixed to said second cover disk element, said inner teeth of said second carrier element being moveable axially in said openings.

8. The clutch disk arrangement of claim 5 wherein the second carrier element comprises an essentially flat ring-shaped part having an inner circumference formed with said radially inner teeth.

9. The clutch disk arrangement of claim 5 wherein the connecting element comprises an axially extending circumferential wall area.

10. The clutch disk arrangement of claim 9 wherein the tabs and openings are formed in the circumferential wall area.

11. The clutch disk arrangement of claim 9 wherein the circumferential wall area comprises a continuous ring-shaped section from which the tabs extend axially.

12. The clutch disk arrangement of claim 11 wherein continuous ring-shaped section and the tabs lie in a circular-cylindrical plane.

13. The clutch disk arrangement of claim 5 wherein the connecting element is fixed to said second cover disk element.

14. The clutch disk arrangement of claim 13 wherein the connecting element is welded to the second cover disk element.

15. The clutch disk arrangement of claim 5 wherein each of said radially outer teeth has a width which increases as the tooth proceeds radially outward, thereby providing a clamping action on the tabs received in the openings.

* * * * *